(12) United States Patent
Asai

(10) Patent No.: US 6,513,629 B2
(45) Date of Patent: Feb. 4, 2003

(54) BRAKE CABLE-CONNECTING APPARATUS FOR DRUM BRAKE

(75) Inventor: Seiji Asai, Okazaki (JP)

(73) Assignee: Nisshinbo Industries, Inc., Tokyo (JP)

( * ) Notice: Subject to any disclaimer, the term of this patent is extended or adjusted under 35 U.S.C. 154(b) by 0 days.

(21) Appl. No.: 09/808,112

(22) Filed: Mar. 15, 2001

(65) Prior Publication Data
US 2002/0005323 A1 Jan. 17, 2002

(30) Foreign Application Priority Data
Mar. 23, 2000 (JP) ........................................ 2000-082727

(51) Int. Cl.[7] .................................................. B60T 1/00
(52) U.S. Cl. ...................................... 188/20; 188/106 A
(58) Field of Search .............................. 188/20, 106 A, 188/106 F, 106 P; 74/502.6

(56) References Cited

U.S. PATENT DOCUMENTS 6,105,732 A * 8/2000 Venetos ........................ 188/20
6,241,051 B1 * 6/2001 Ohnishi et al. ......... 188/106 A

FOREIGN PATENT DOCUMENTS

| EP | 0 311 346 A1 | 4/1989 |
| FR | 2 772 704 | 6/1999 |
| JP | A 10-220506 | 8/1998 |

* cited by examiner

Primary Examiner—Jack Lavinder
Assistant Examiner—C. T. Bartz
(74) Attorney, Agent, or Firm—Liniak, Berenato & White

(57) ABSTRACT

A brake cable-connecting apparatus for a drum brake, having a simplified structure and designed to permit a cable end to be steadily seated on a brake lever, thereby providing improved durability of an inner cable, and to further positively holds a brake cable in position, which otherwise would be disengaged from the brake lever. A drum brake comprises: slanted surfaces 27c, 28c for permitting an inner cable 29a to be deflected while a cable end 29b of a brake cable 29 is slid along an outer edge of a free end 26a of a brake lever 26, the cable end 29b being advanced from a direction in which the brake cable 29 is pulled, to a opposite direction in which the brake cable 29 is pulled; and, an opening formed in series with a cable-receiving groove 26b for receiving the inner cable 29a.

14 Claims, 7 Drawing Sheets

BRAKE CABLE-CONNECTING APPARATUS FOR DRUM BRAKE

BACKGROUND OF THE INVENTION

1. Field of the Invention

This invention relates to an apparatus for connecting a brake cable from the outside of a brake to a brake lever in the brake. More particularly, it relates to an improved brake cable-connecting apparatus designed to automatically connect the brake cable to the brake lever with a simple snap-in operation.

2. Description of the Related Art

The present Applicant has proposed the above type of a prior art brake cable-connecting apparatus for a drum brake in published Japanese Patent Application Laid-Open No. 10-220506. This prior art brake cable-connecting apparatus will be described with reference to FIGS. 6 and 7. FIG. 6 is a plan view, illustrating a leading-trailing type (LT type) drum brake, while FIG. 7 is a perspective view, illustrating a connecting area around a connected brake cable. This drum brake offers a combination of a hydraulic actuated type service brake and a mechanical actuated type parking brake.

A back plate 10 is fixed to a non-rotatable portion of a vehicle such as a vehicle body. A pair of brake shoes 11, 12 is resiliently mounted on the back plate 10 to be movable relative to the back plate 10 by shoe-holding devices 13, 14. The brake shoes 11, 12 include semicircular shaped shoe webs 11a, 12a, shoe rims 11b, 12b rigidly secured to the shoe webs 11a, 12a on outer circumferential surfaces thereon to form a T-shaped in cross-section, and linings 11c, 12c affixed on outer peripheral surfaces of the shoe rim 11b, 12b, respectively.

Lower adjacent ends of the brake shoes 11, 12 abut against and engaged with an anchor 10a fixed on the back plate 10 by means of rivets, while upper adjacent ends operatively engage with respective pistons of a hydraulic actuated type wheel cylinder 15 rigidly secured to the back plate 10 by means of bolts. The anchor 10a may be a single unitary press-forging including a rectangular shaped portion, supporting the brake shoe 11, 12, and flanged portions, extend over the shoe webs 11a, 12a so as to restrict the lifting of the brake shoes 11, 12. Alternatively, a combination of a rectangular anchor block supporting the brake shoes 11, 12 and a retaining plate superposed thereon may be utilized by securing the two on a protrusion of the back plate 10 by means of rivets.

A mechanical actuated type brake lever 16 is superposed on the shoe web 11a. The brake lever 16 has a base portion 16a rotatably supported by a lever pin 17 at the upper side of the shoe web 11a. A projection 16b protrudes from a rear edge of the intermediate portion of the brake lever 16 and restricts a clockwise movement of the brake lever 16 in FIG. 6 (a retracted position in a clockwise direction in FIG. 6) by abutting against an inner surface of the shoe rim 11b. A free end 16c is folded in a U-shape, thereby forming a cable-receiving groove 16d. The folded free end 16c has a slanted surface 16e, rising in an upper-right direction in FIG. 7 or in a direction in which a cable end 19b is advanced while the after-described inner cable 19a is caused to sag. The slanted surface 16e is formed at an edge of the folded free end 16c and a projection 16f protrudes in an opposite direction in which a brake cable 19 is pulled. A spoon-like guiding portion 16g, guides the cable end 19b to the slanted surface 16e, formed at a main body of the free end 16c in a direction in which the brake cable 19 is pulled.

A strut 18, bridged between an intermediate portion of the brake lever 16 and the brake shoe 12, is positioned adjacent to the wheel cylinder 15 for adjusting a shoe clearance between a brake drum (not shown) and the brake shoes 11, 12.

A brake cable 19, having the cable end 19b fixedly attached to an inner cable 19a at one end thereof, is connected to the brake lever 16 by receiving the inner cable 19a in the cable-receiving groove 16d and by engaging the cable end 19b with an edge of the cable-receiving groove 16d in the opposite direction in which the brake cable 19 is pulled.

A biasing means, slidably housing the inner cable 19a therein and biasing the inner cable 19a, is provided in the brake between an intermediate portion of the inner cable 19a and a rightward portion thereof in FIG. 6. The biasing means is formed by a curved guide pipe 10b and is rigidly secured to the back plate 10 in a state in which an opening of the guide pipe 10b in the brake is oriented toward the guide portion 16g.

The other end of the inner cable 19a, not shown, is connected to an operating means such as a hand lever, and a portion of the inner cable 19a, exposed to an ambient air outside of the brake, is usually surrounded and protected by an outer casing.

A leaf spring 20 has a base portion rigidly fixed to the brake lever 16 on a planar surface thereof, and a free end 20a bent at a right angle with respect to the planar surface and extending toward the projection 16f. Such an extending end of the free end 20a is spaced apart from the projection 16f by a gap such as to prevent disengagement of the cable end 19b from the brake lever 16 when the inner cable 19a is left slack before cable routing, or otherwise when the cable end 19b is caused to return to its initial position earlier than the brake lever 16 after pulling of the inner cable 19a is released.

A torsion spring 21 provided resiliently between the brake lever 16 and the shoe web 11a has a primarily function to return the inner cable 19a to its initial position, and at the same time acts in an auxiliary manner to return the brake lever 16 to its restrict position.

Upper and lower shoe return springs 22, 23 are stretched between the brake shoes 11, 12, respectively.

The brake operation in the above-described structure will be explained with reference to FIG. 6.

In service braking, when the wheel cylinder 15 is pressurized, the pistons of the wheel cylinder 15 at both ends thereof thrust the upper adjacent ends of the brake shoes 11, 12 in opposite directions. Then, the linings 11c, 12c are brought into frictional engagement with the brake drum (not shown), thereby braking the brake drum.

Now, another brake operation in the parking brake will be explained. When the brake cable 19 is pulled under remote control, the brake lever 16 is pivoted about the lever pin 17 in a counterclockwise direction in FIG. 6; the strut 18 is then moved rightward, thereby thrusting the brake shoe 12 at the right in FIG. 6. At this time, a counteracting force occurs, which thrusts the opposite brake shoe 11 via the lever pin 17. As a result, the linings 11c, 12c are brought into frictional engagement with the brake drum, thereby braking the brake drum.

Now, the brake cable connecting procedure to the brake lever 16 in the above-described structure will be explained.

Grasping the inner cable 19a by hand, the cable end 19b is inserted into the guide pipe 10b from the outside of the brake, and is advanced in a direction biasing from an initial orientation and is brought to the guide portion 16g. If the inner cable 19a is further pushed, the cable end 19b is moved upward on the slanted surface 16e with sagging of the inner cable 19a, and eventually deflects the free end 20a of the leaf spring 20 in moving over the projection 16f. At the same time, the inner cable 19a is caused to spring back to its original linear shape by means of a self-spring force that builds up in the deflected inner cable 19a at the same time. Consequently, the inner cable 19a is automatically received in the cable-receiving groove 16d in engagement therewith. In addition, the cable end 19b is engaged with the edge of the cable-receiving groove 16d in the opposite direction in which the cable 19 is pulled. As a result, the brake cable 19 is connected to the brake lever 16.

However, there are problems associated with the above-described prior art brake cable-connecting apparatus.

Until routing an operating portion of the brake cable (e.g., the side of the vehicle hand lever) is completed, or when the brake cable 19 had been routed with slacking of the inner cable 19a, then there is a likelihood that the inner cable 19a is dislocated from the cable-receiving groove 16d or the cable end 19b is disengaged from the projection 16f, because the cable end 19b is moved in an upward direction in FIG. 6 along the inner surface of the shoe rim 11b. Further, when the pulling of the brake cable 19 is released, then there is again a possibility that the cable end 19b may be disengaged from the projection 16f if the inner cable 19a is caused to return its initial position ago earlier than the brake lever 16.

In order to overcome such problems, the conventional brake cable-connecting apparatus includes the leaf spring positioned in such a manner that a tip of the free end of the leaf spring 20 closer to the cable-receiving groove 16d in order to prevent the inner cable 19a dislocating and the cable end 19b disengaging.

However, since the leaf spring 20 must be provided in a small space, such a layout is difficult to make, with a consequential increase of the components.

Since a relatively great acting force is exerted on the brake lever 16, the brake lever 16 is usually made of either a steel plate or a carbon steel casting, which has a thickness of at least 4 mm. However, in viewpoint of productability and cost, the steel plate is usually pressed-formed into the brake lever 16.

In press-forming the steel plate, the free end 16c of the brake lever 16 is bent into a U-shaped configuration in order to form the cable-receiving groove 16d. At this time, an inner peripheral surface of a groove bottom is contracted, while an outer peripheral surface of the U-shaped portion is expanded, thereby causing excess metal portions at both edges of the groove bottom. As a result, the cable end is unsteadily seated on one such groove bottom edges. This status causes a bending force to be repeatedly imposed on the inner cable 19a in the immediate vicinity of a neck of the cable end 19b, with a concomitant reduction in durability of the inner cable 19a. In addition, removal of the excess metal portions using a grinder requires a lot of time and effort, although the cable end 19b is steadily seated on the groove bottom edge.

The curved guide pipe 10b is employed as a means for biasing the brake cable 19. However, a thick material must be used to form the guide pipe 10b because a biasing force acts on the curved portion of the guide pipe 10b during operation of the brake cable. As a result, the guide pipe 10b is made heavier in weight. In addition, since the guide pipe 10b is fillet-welded to the back plate 10, the back plate 10 may deform by the influence of heat during the welding, thereby consequential reducing in dimensional accuracy of the back plate 10.

SUMMARY OF THE INVENTION

In view of the above, an object of the present invention is to provide a brake cable-connecting apparatus for a drum brake, designed to provide easy layout, even with a small space, to permit a cable end to be steadily seated on a brake lever, and to reliably holds a brake cable in position through the aid of a simplified structure, which otherwise would be disengaged from the brake lever.

An aspect of the present invention provides a brake cable-connecting apparatus for a drum brake, including a brake lever positioned over a shoe web of a brake shoe. The brake lever has a proximal end rotatably supported on the shoe web. A biasing means permits the brake cable to be advanced toward a free end of the brake lever. The brake cable is inserted into the brake from the outside of the brake, and a cable end is fixed to the brake cable, the cable end being held against a back edge of the brake lever in a direction opposite to a direction in which the brake cable is pulled. The brake cable is thereby connected to the brake lever, wherein a slanted surface formed at the free end of the brake lever along an outer edge of the free end permits an inner cable to be resiliently deformed while the cable end is slid on the outer edge of the free end when the cable end is advanced to the free end of the brake lever. Furthermore, an opening formed in series with a cable-receiving groove receives the inner cable.

According to another aspect of the present invention, a brake cable-connecting apparatus is provided, wherein an abutment plate is disposed on a main body of the brake lever at a free end of the brake lever, the abutment plate being positioned opposite to the free end of the brake lever, and further wherein the main body of the brake lever and the abutment plate cause both of the cable-receiving groove and the opening to be formed at the free end of the brake lever.

According to a further aspect of the present invention, a brake cable-connecting apparatus is provided, wherein the abutment plate is made of a thin plate, and wherein the abutment plate has a slanted surface defined along an outer edge of the abutment plate, the slanted surface being formed by a bent surface that is bent in a direction in which the bent surface is spaced apart from the main body of the brake lever.

According to a yet further aspect of the present invention, a brake cable-connecting apparatus is provided, wherein the abutment plate is formed with an extension that extends from the bent surface of the abutment plate in a crank-like or stepped manner, and further wherein a groove defined between the extension and the main body of the brake lever has a width large enough to permit the cable end to pass through the groove, but is too small to allow a coiled compression spring to travel through the groove, the coiled spring being wound around the inner cable.

A still further aspect of the present invention provides a brake cable-connecting apparatus, wherein the biasing means for biasing the brake cable is formed by a plate-like member that extends from an anchor portion, the anchor portion supporting the brake shoe.

Another aspect of the present invention is to provide a brake cable-connecting apparatus, wherein the plate-like member is a retaining plate that restrains the brake shoe from floating in a direction parallel to the axis of the brake.

Still another aspect of the present invention is to provide a brake cable-connecting apparatus, wherein a biasing force that acts on the inner cable during operation of the brake cable is supported by a back plate adjacent to the anchor portion, the brake shoe being movably positioned on the back plate.

BRIEF DESCRIPTION OF THE DRAWINGS

FIG. 4b is a left side view of FIG. 4a;

FIG. 4c is a right side view of FIG. 4a;

FIG. 5b is a left side view of FIG. 5a;

DETAILED DESCRIPTION OF THE PREFERRED EMBODIMENTS

Figure 1:
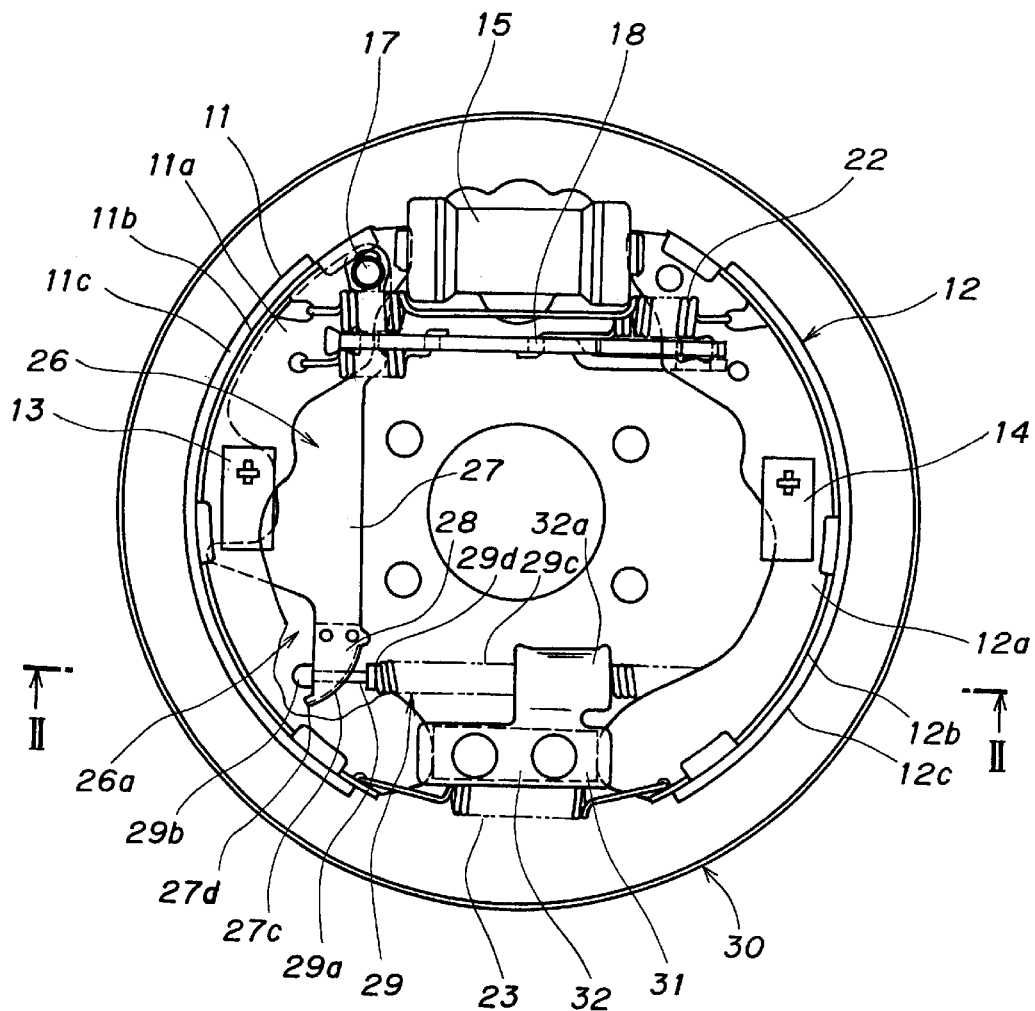
FIG. 1 is a plan view, illustrating a drum brake according to one embodiment of the present invention.

A brake cable-connecting apparatus for a drum brake according to first embodiment of the present invention will be explained with reference to FIGS. 1–4. The same reference numerals are hereinafter given for numerals identical in function to those described in the prior art; therefore, descriptions related thereto will be omitted hereinafter. The drum brake comprises a pair of brake shoes 11, 12 and shoe-holding devices 13, 14. Reference numerals 15, 17, and 18 denote a wheel cylinder 15; a lever pin 17; a strut 18; and a pair of shoe return springs 22, 23 that are substantially vertically opposed to one another. The above-mentioned components are identical in function to those described in the prior art.

A brake lever 26 is identical to the prior art-brake lever 16 except that a free end 26a of the former lever 26 differs in shape from the free end 16c of the latter lever 16. The free end 26a is made planar at a lever body 27. The lever 26 has an attachment plate 28 integrally combined there with at the free end 26a. The attachment plate 28 is opposed to the planar lever body 27.

Figure 4A:
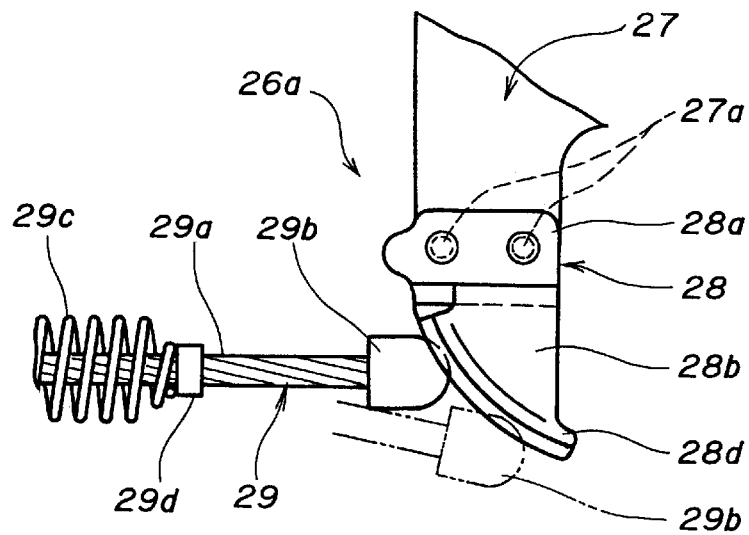
FIG. 4a is an enlarged view of a free end of the brake lever when viewed from the back plate, illustrating a bottom view of the free end when the brake cable is connected to the brake lever.

A structure of the free end 26a will be explained with reference to FIGS. 4a, 4b, and 4c. The lever body 27 has two projections 27a protruding outward formed at an intermediate portion thereof. The substantially crank-shaped attachment plate 28 has holes pierced through a seat piece 28a thereof, and the projections 27a are fit into the respective holes. Then, protruding ends of the projections 27a are forged, thereby causing the seat part 28a to be sealingly attached to the lever body 27. As a result, the attachment plate 28 and the lever body 27 are integrally combined together. Alternatively, these two components 27, 28 may be formed into a one-piece by means of either spot welding or projection welding.

Figure 3:
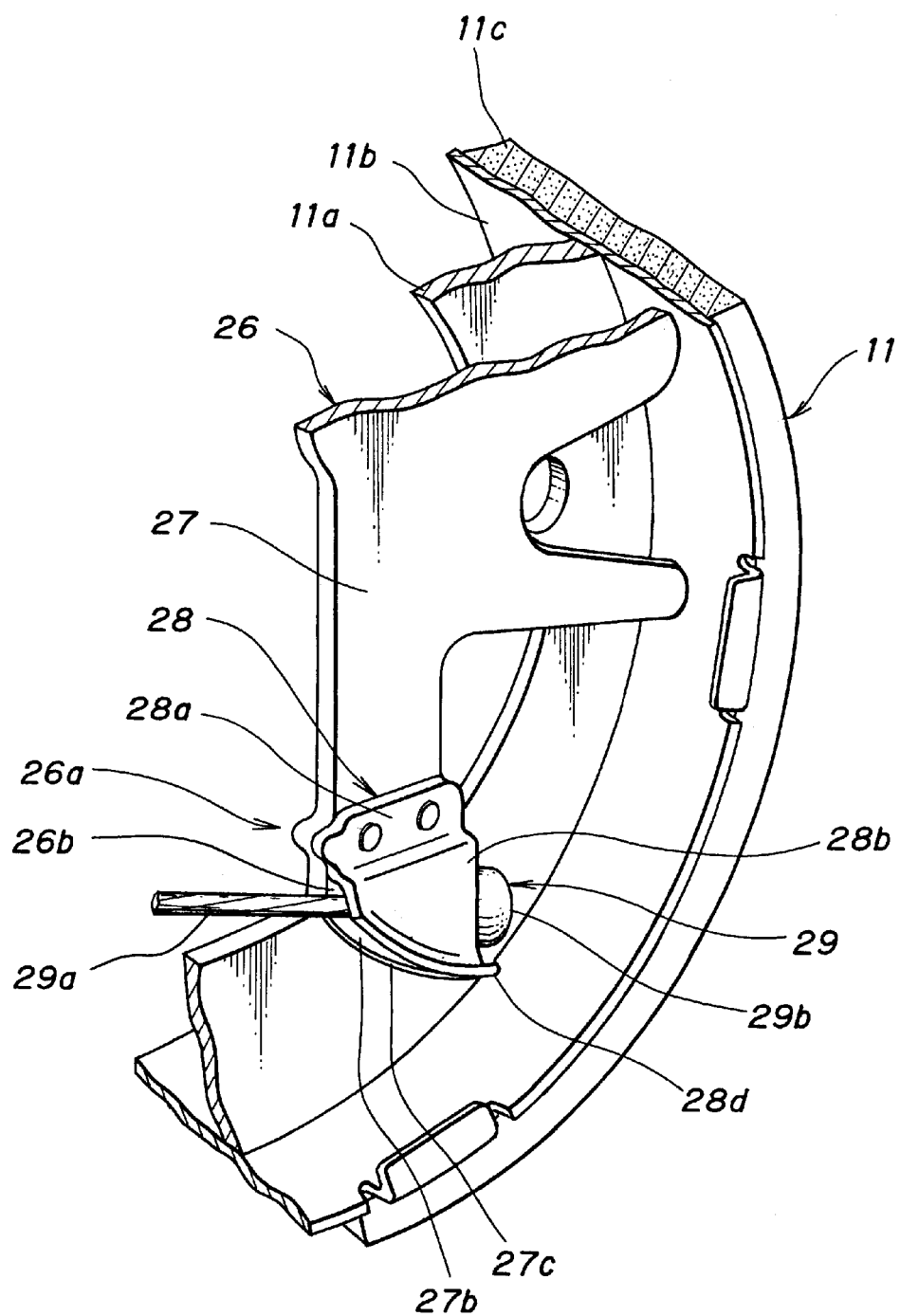
FIG. 3 is a perspective view when seen from a back plate side, illustrating a brake lever having a brake cable connected thereto.

The attachment plate 28 is firstly bent at a position slightly above the axis of the after described brake cable 29 during operation of the brake cable 29 and secondly bent so as to extend in a direction in which the attachment plate 28 is spaced apart from the lever body 27. Thus, the attachment plate 28 has a first opposed part 28b extending from such a second bent portion of the attachment plate 28 in a direction that is substantially parallel to the lever body 27 so as to form a cable-receiving groove 26b (see FIGS. 4b and 4c). That is, the first opposed part 28b is formed in a crank-like or stepped manner. The cable receiving groove 26b has a width slightly greater than a diameter of an inner cable 29a. Attention is now directed to outer edges of the attachment plate 28 and the lever body 27. (See the outer edges on a lower side in FIG. 4a.) One side of the respective outer edges in the direction in which the cable 29 is pulled are located above the axis of the cable 29, while the other side thereof in the opposite direction in which the cable 29 is pulled is located below the cable end 29b. That is, outer edges cause both the free end 26a of the lever body 27 and the attachment plate 28 to form substantially triangular shapes as shown in FIGS. 3 and 4a. The outer edges facing in the direction in which the cable 29 is pulled form respective slanted surfaces, i.e., a slanted surface 27c of the lever body 27 and the slanted guiding surface 28c of the attachment plate 28. In otherwords, it is desirable to provide slanted surfaces that allow the cable end 29b to slide downward in FIG. 4a with a deflection of the inner cable 29a, when the cable end 29b is advanced from the direction in which the brake cable 29 is pulled to the opposite direction. In addition, the lever body 27 and the attachment plate 28 have respective backward projections 27d, 28d provided at outer ends of the free end 26a (see FIGS. 3 and 4a).

Figure 4B:
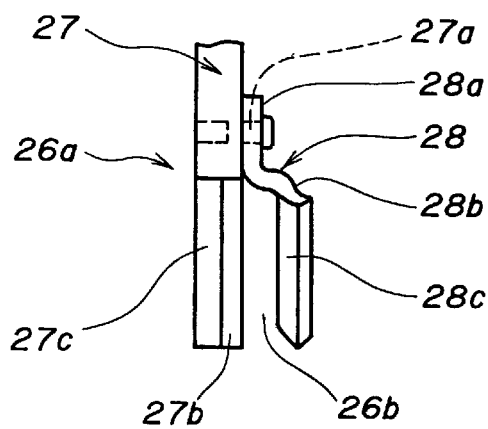
Figure 4C:
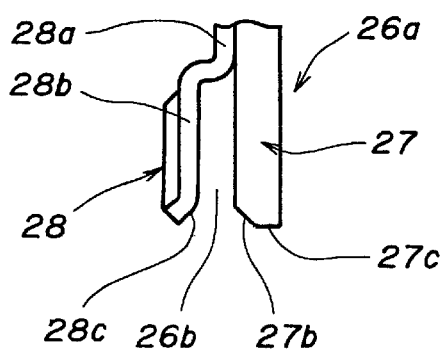

As above described, the attachment plate 28 has the guiding surface 28c defined at the outer end thereof, which guiding surface 28c is bent in a direction away from the lever body 27 (see FIG. 4b). However, such a guiding surface 28c is not essentially required. In order to positively guide the cable end 29b in an easier manner, it is advantageous to provide the aforesaid guiding surface 28c, or alternatively to have a chamfer 27b provided on the slanted surface 27c of the lever body 27 at a position facing toward the cable-receiving groove 26b by means of press working.

Figure 2:
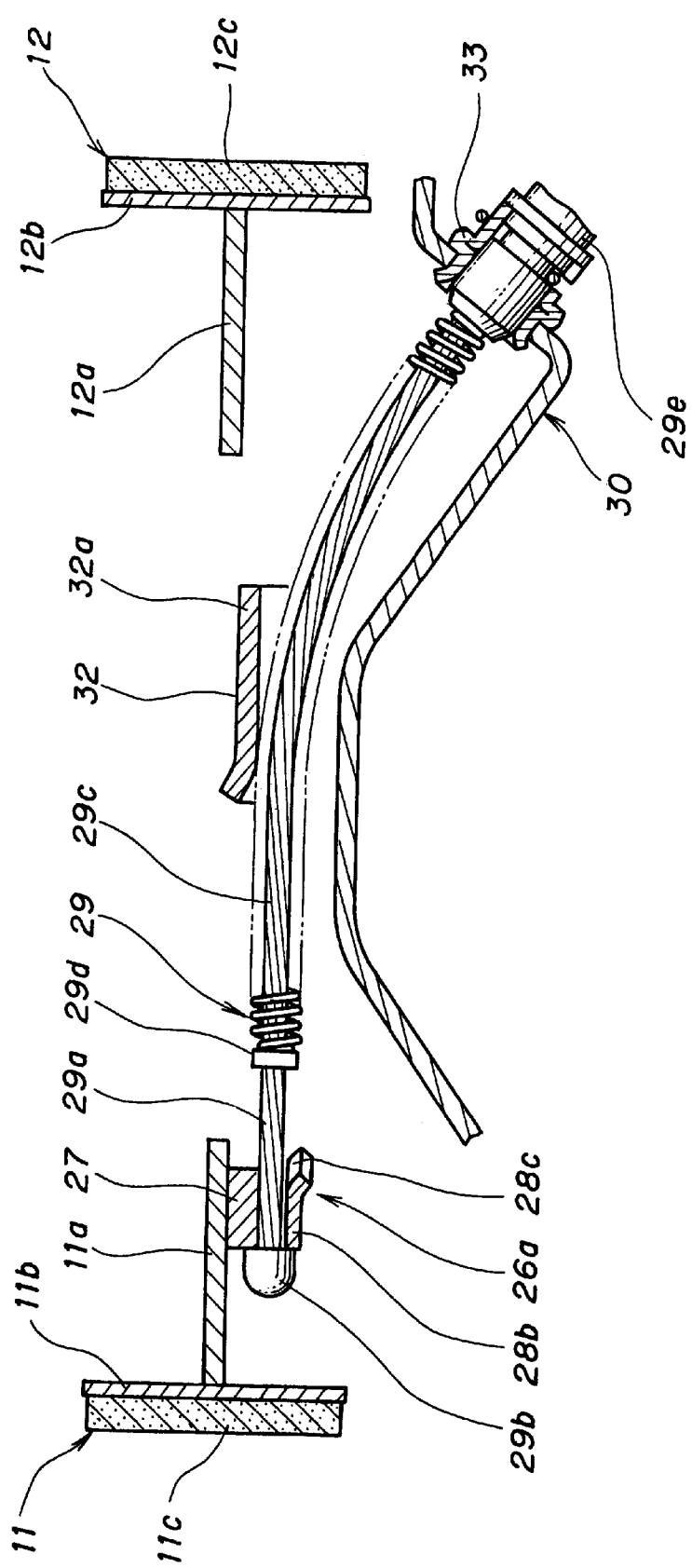
FIG. 2 is a cross-sectional view taken along line II—II of FIG. 1, illustrating the drum brake.

The brake cable 29 according to the present embodiment is comparable to the prior art brake cable 19 with the addition of a cable return spring 29c. However, the cable return spring 29c is not essential component. With reference to FIG. 2, a coiled spring 29c, spirally wound around the inner cable 29a, is positioned and compressed between a cap of the outer casing 29e and a stopper 29d fixed to the inner cable 29a. The stopper 29d is spaced apart from the cable end 29b by a distance greater than a maximum width of the free end 26a.

As shown in FIG. 1, the back plate 30 has a protrusion thereon. An anchor block 31 and a retaining plate 32 are positioned one above another on the protrusion of the back plate 30 and are secured to the back plate 30 by mean of rivets. The protrusion, the anchor block 31, and the retaining plate 32 define an anchor portion. A biasing portion 32a extends from the retaining plate 32 at an intermediate portion of the brake so as to cover the cable return spring 29c. In addition, the protrusion of the back plate 30 supports the cable return spring 29c at a position toward the back plate 30. Further, a pipe 33 is fixed to a boss of the back plate 30 for attachment to the cap of the outer casing 29e (FIG. 3).

Next, it will be explained how the brake cable 29 is connected to the brake lever 26.

When the cable end 29, the inner cable 29a, and the cable return spring 29c are inserted into the pipe 33 from the outside of the brake, the cable end 29b strikes against the biasing portion 32a, and is thereby advanced in a different direction to reach the slanted surfaces 27c, 28c at free end 26a (see FIG. 2). When the brake cable 29 is further pushed, the cable end 29b is moved downward in FIG. 4a along the slanted surfaces 27c, 28c, while the inner cable 29a is deflected. The cable end 29b is ultimately moved over the backward projections 27d, 28d. At the same time, a self-spring force that builds up in the deflected inner cable 29a causes itself to spring back to a linear shape. Then, the inner cable 29a is automatically received in the cable-receiving groove 26b in engagement therewith. In addition, the cable end 29b is interlocked with a back edge of the free end 26a in the opposite direction in which the cable 29 is pulled. In this way, the brake cable 29 is connected to the brake lever 26. At this time, the inner cable 29a bumps against the cable-receiving groove 26b at a groove bottom thereof, and then emits an impact noise. Therefore, a success in connecting the brake cable 29 to the brake lever 26 is easily perceivable outside the brake. Thereafter, the cap of the outer casing 29e is attached to the pipe 33, and then an operating side (not shown) of the brake cable 29 is connected to vehicular components. Then, the cable-connecting operation is completed.

The brake of the above structure is operated in a manner similar to that in the previously described prior art, and an explanation thereof will be omitted. When parking brake is rendered operative, the back plate 30 supports a biasing force that tends to maintain the inner cable 29a in a linear shape. This feature eliminates concern about strength, which is caused in the prior art guide pipe. In addition, while the cable return spring 29c is compressed, the inner cable 29a is slid within such coiled spring 29c. Accordingly, the inner cable 29a and the spring 29c are relatively moved with respect to one another by a very small degree. As a result, the inner cable 29a provides considerably improved durability. Furthermore, since the biasing portion 32a merely experiences a working force sufficient to bias the inner cable 29a, the biasing portion 32a can be made smaller in size.

When the inner cable 29a is loosely routed, or otherwise when the operating portion of the inner cable 29a is not yet routed, then the above-described structure causes the inner cable 29a to strike against the groove bottom of the cable-receiving groove 26b, thereby restraining further movement of the inner cable 29a, even if the cable end 29b is moved along an inner surface of the shoe rim 11b in the opposite direction in which the cable 29 is pulled. As a result, the inner cable 29a and the cable end 29b are held in position, which otherwise would be come out from the brake lever 26.

Figure 5A:
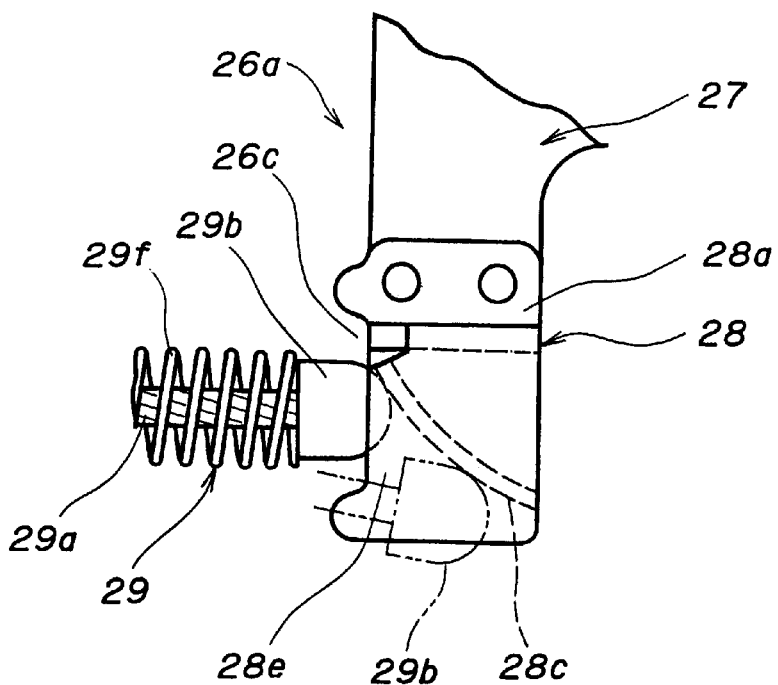
FIG. 5a is an enlarged view of a free end of a brake lever according to another embodiment of the present invention when viewed from the back plate, illustrating a bottom view of the free end when a brake cable is connected to the brake lever.
Figure 5B:
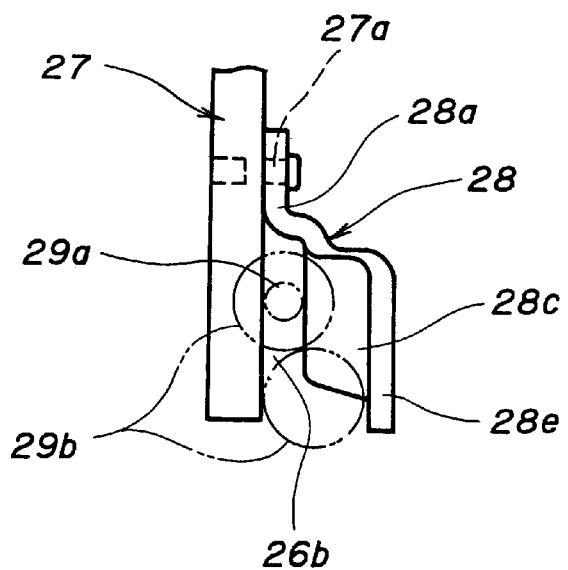
Figure 6:
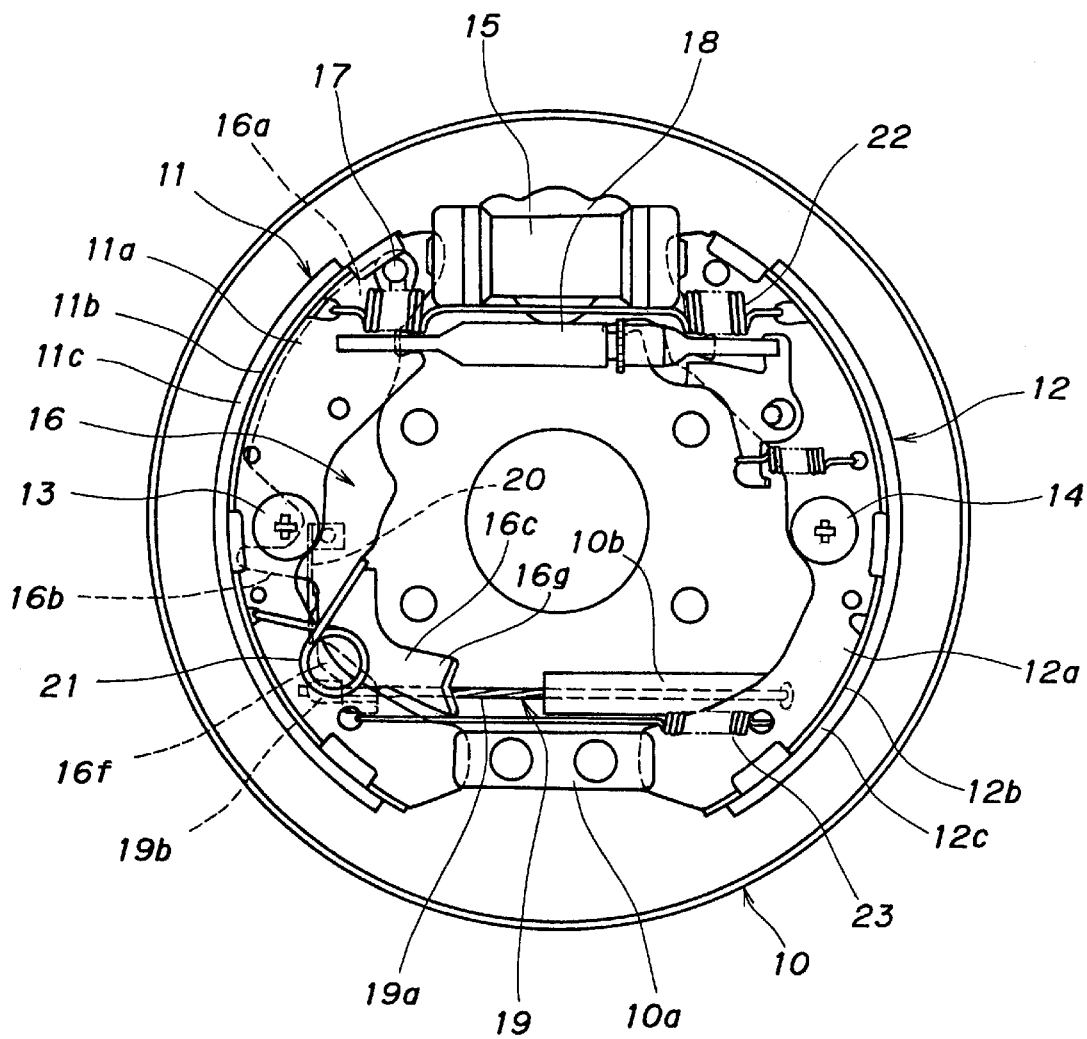
FIG. 6 is a plan view, illustrating a conventional drum brake.
Figure 7:
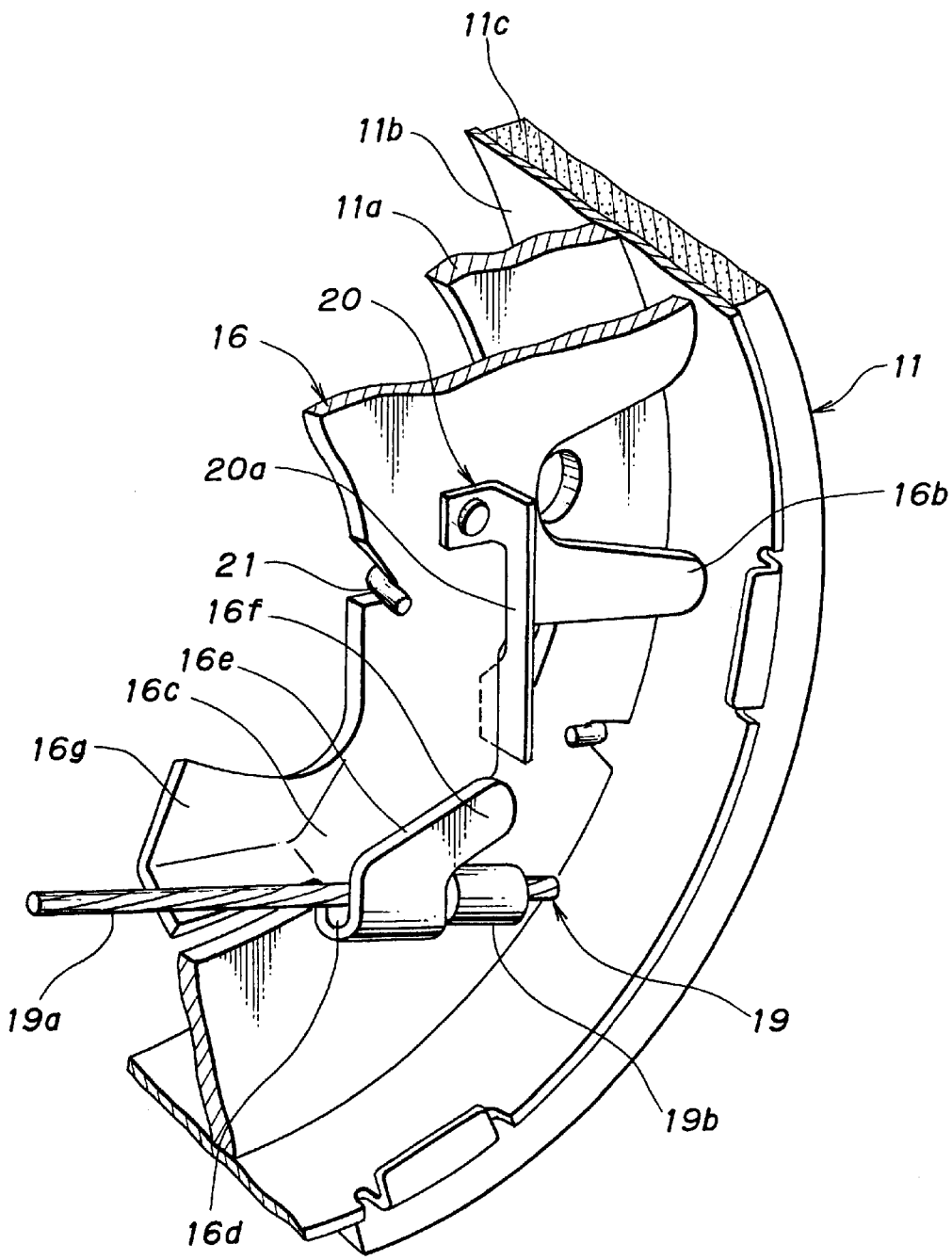
FIG. 7 is a perspective view of the drum brake of FIG. 6 when seen from the back plate side, illustrating a brake lever having a brake cable connected thereto.

FIGS. 5a and 5b illustrate another embodiment of the present invention, in which the previously described embodiment is modified. The attachment plate 28 has a second opposed piece 28e extending from the slanted surface 28c. The second opposed piece 28e is bent in a crank-like or stepped manner so as to be spaced apart from the brake lever body 27 by a distance slightly wider than an outer diameter of the cable end 29b. Similarly to the attachment plate 28, the lever body 27 has an outer end extending downward in FIG. 5. In addition, first recess 26c is formed at an edge of the lever body 27 in the direction in which the cable 29 is pulled and has a width greater than an outer diameter of a cable return spring 29f. Further, the cable return spring 29f according to the present embodiment has an inner diameter smaller than an outer diameter of the cable end 29b, but has an outer diameter large enough thereof to compress the spring 29f between the cable end 29b and the cap of the outer casing 29e.

In connecting the brake cable to the brake lever in accordance with the present embodiment, one end of the cable return spring 29f is seated within the recess 26c. Similarly to the previously mentioned embodiment, the cable end 29b is held against an edge of the free end 26a in the opposite direction in which the cable 29 is pulled. As a result, the brake cable 29 is connected to the brake lever 16. At this time, the cable return spring 29f reliably holds the inner cable 29a in position, which otherwise would be come out from the cable-receiving groove 26b. This feature eliminates the need for the backward projections 27d, 28d that are offered in the first embodiment assuming that the brake cable 29 travels at a stroke such that the backward projections 27d, 28d fail to serve their functions. Then, unless the cable return spring 29f is contracted, the inner cable 29a and the cable end 29b are held in position under any circumstance once one end of the cable return spring 29f is seated within the recesses 26c, even when the inner cable 29a returns to its initial position earlier than the brake lever 26. As a result, such disengagement-proof means provides enhanced reliability.

Furthermore, a second recess 26c is formed at an edge of the attachment plate 28 in the direction in which the cable 29 is pulled. This second recess 26c will be utilized if a large diameter washer is provided between the cable return spring 29f and the cable end 29b.

The present invention is not limited to the above embodiment, but is applicable to a known duo-servo type (DS type) drum brake. In short, the present invention is evidently applicable to any drum brake of a type in which the brake cable 29 is designed for connection to the brake lever 26 through the biasing means. In addition, although the present embodiments illustrate the brake cable-connecting apparatus operated by the brake cable 29 as an example of a parking brake-adapted apparatus, the same apparatus is usable as a service brake-adapted apparatus. Furthermore, the brake lever 26 may be disposed over the shoe web 11a in a direction opposite to the back plate 30. Moreover, the second opposed piece 28e according to the embodiment as shown in FIG. 5 maybe provided only toward the recesses 26c. This means that a portion of the second opposed piece 28e located in a direction opposite to the recesses 26c may be omitted. Further, in order to facilitate receiving the cable end 29b when it is connected to the brake lever 26, respective ends of the recesses 26c in the direction in which the cable 29 is pulled may be opened wider in a direction in which such ends are spaced apart from one another.

The present invention provides following effects:
(1) In the first embodiment, when the operating portion of the brake cable is being routed, or when the slack inner cable is routed, the inner cable is moved toward the groove bottom of the cable-receiving groove, thereby restricting further movement of the inner cable, even if the cable end is moved on the inner surface of the shoe rim in the opposite direction in which the brake cable is pulled. As a result, there is no likelihood that the inner cable will come out from the cable-receiving groove, or that the cable end is disengaged from the interlocking portion of the brake lever.
(2) In the second embodiment, the cable return spring spirally wound around the inner cable is compressed between the cable end and the outer casing, while one end of the cable return spring is seated within the recesses that are formed on the brake lever at the free end thereof. Thus, the cable return spring the inner cable and the cable end to be held in position under any circumstance in which, e.g., the inner cable is caused to return its initial position earlier than the brake lever after pulling of the brake cable is released. As a result, such a disengagement-proof means provides considerably enhanced reliability.

(3) The cable return spring combined integrally with the brake cable provides a simplified brake structure and thus easy design. In addition, since the inner cable is slid along an inner circumference of the cable return spring when the brake cable is pulled, the inner cable and the cable return spring are relatively moved with respect to one another by a very small degree through the aid of the contraction of the spring. As a result, the inner cable provides remarkably improved durability.

(4) The free end of the brake lever, against which the cable end is held for connected thereto, can be formed by the step of press shaping with a planar plate along an outline of the free end. This ensures a good planar surface. As a result, the cable end is steadily seated on the free end, and thus the inner cable experiences no bending force, with a consequential increase in durability of the inner cable.

(5) The biasing portion functioning as a biasing means for biasing the brake cable, which experiences only a small working force, is formed by a plate-like member that extends from the retaining plate of the anchor portion. Thus, the biasing means can be made smaller in size and lighter in weight. In addition, the use of the retaining plate to restrict the lifting of the brake shoes from the back plate realizes fewer components.

(6) The back plate supports a great biasing force that acts on the inner cable when the brake cable is pulled. This feature eliminates concern about strength, which is caused in the prior art guide pipe.

What is claimed is:

1. A brake cable-connecting apparatus for a drum brake comprising:
    a brake lever, supported on a shoe web of a brake shoe, having a forked free end with a cable receiving groove and a proximal end rotatably supported on the shoe web,
    a brake cable including an inner cable and a cable end fixed on a tip end of the inner cable,
    a biasing means, separated from the free end of the brake lever, urging the brake cable, inserted into the brake from outside of the brake, to advance toward the free end of the brake lever for engaging the cable end with a back edge of the brake lever in an opposite direction in which the brake cable is pulled,
    the brake cable being thereby connected to the brake lever,
    wherein
    a slanted surface is formed along an outer edge of the free end of the brake lever at a cable pulling direction side thereof for permitting the inner cable to be resiliently deformed while the cable end is slid on the outer edge of the free end when the cable end is advanced along the free end.

2. A brake cable-connecting apparatus as defined in claim 1, wherein
    an attachment plate is disposed on a main body of the brake lever at the free end thereof, the attachment plate being positioned opposite to the free end of the brake lever, and the main body of the brake lever and the attachment plate forming the cable-receiving groove at the free end of the brake lever.

3. A brake cable-connecting apparatus as defined in claim 2, wherein
    the attachment plate is made of a thin plate, and the attachment plate has a slanted surface defined along an outer edge of the attachment plate, the slanted surface being formed by a bent surface that is bent in a direction away from the main body of the brake lever.

4. A brake cable-connecting apparatus as defined in claim 3, further comprising a coiled spring wound around the inner cable, wherein
    the attachment plate is formed with an extension that extends from the bent surface thereof in a stepped manner, and a groove defined between the extension and the main body of the brake lever has a width large enough to permit the cable end to pass through the groove, but is too small to allow said coiled compression spring to travel through the groove.

5. A brake cable-connecting apparatus as defined in claim 1, wherein
    the biasing means for biasing the brake cable is formed by a plate-like member that extends from an anchor portion, the anchor portion supporting the brake shoe.

6. A brake cable-connecting apparatus as defined in claim 5, wherein
    the plate-like member is a retaining plate that restrains the brake shoe from floating in a direction parallel to an axis of the brake.

7. A brake cable-connecting apparatus as defined in claim 1, wherein
    a biasing force that acts on the inner cable during operation of the brake cable is supported by a back plate adjacent to the anchor portion, the brake shoe being movably positioned on the back plate.

8. A brake cable-connecting apparatus for a drum brake comprising:
    a brake lever supported on a shoe web of a brake shoe, said brake lever having a forked free end with a cable receiving groove and a proximal end rotatably supported on the shoe web,
    a brake cable including an inner cable and a cable end fixed on an end of the inner cable,
    a biasing means, separated from the free end of the brake lever, urging the brake cable, inserted into the brake from outside of the brake, to advance toward the free end of the brake lever for engaging the cable end with a back edge of the brake lever in an opposite direction in which the brake cable is pulled, wherein
    the brake cable being thereby connected to the brake lever,
    a slanted surface formed along a peripheral edge of the free end of the brake lever at a cable pulling direction side thereof for creating a resilient deformation of the inner cable away from the receiving groove while the cable end is slid on the slanted surface,
    a spring force created by said resilient deformation of said inner cable causes said inner cable to spring into said cable receiving groove after said cable end moves past an end of said slanted surface.

9. A brake cable-connecting apparatus as defined in claim 8, wherein an attachment plate is disposed on a main body of the brake lever adjacent said main body of the brake lever to thereby form said cable receiving groove.

10. A brake cable-connecting apparatus as defined in claim 9, wherein the attachment plate is made of a thin plate, and the attachment plate has a bent surface that is bent in a direction away from the main body of the brake lever.

11. A brake cable-connecting apparatus as defined in claim 10, further comprising a coiled spring wound around the inner cable, wherein the attachment plate is formed with an extension that extends from the bent surface thereof in a stepped manner, and a groove defined between the extension and the main body of the brake lever has a width large enough to permit the cable end to pass through the groove, but is too small to allow said coiled compression spring to travel through the groove.

12. A brake cable-connecting apparatus as defined in claim 8, wherein the biasing means for biasing the brake cable is formed by a plate-like member that extends from an anchor portion supporting the brake shoe.

13. A brake cable-connecting apparatus as defined in claim 12, wherein the plate-like member is a retaining plate that restrains the brake shoe from floating in a direction parallel to an axis of the brake.

14. A brake cable-connecting apparatus as defined in claim 8, wherein a biasing force that acts on the inner cable during operation of the brake cable is supported by a back plate adjacent to the anchor portion, the brake shoe being movably positioned on the back plate.

* * * * *